(12) United States Patent
Yaberg

(10) Patent No.: US 9,038,440 B2
(45) Date of Patent: May 26, 2015

(54) SPEAKER LEAK TEST SYSTEM AND METHOD

(75) Inventor: Tyson Osborne Yaberg, Camarillo, CA (US)

(73) Assignee: AUDYSSEY LABORATORIES, INC., Los Angeles, CA (US)

( * ) Notice: Subject to any disclaimer, the term of this patent is extended or adjusted under 35 U.S.C. 154(b) by 364 days.

(21) Appl. No.: 13/461,639

(22) Filed: May 1, 2012

(65) Prior Publication Data

US 2013/0291624 A1 Nov. 7, 2013

(51) Int. Cl.
G01M 3/04 (2006.01)
G01M 3/34 (2006.01)

(52) U.S. Cl.
CPC .................................. *G01M 3/34* (2013.01)

(58) Field of Classification Search
CPC ............................ G01M 3/3281; G01M 3/329
USPC ........................................ 73/40, 49.2, 49.3
See application file for complete search history.

(56) References Cited

U.S. PATENT DOCUMENTS

| | | | | |
|---|---|---|---|---|
| 3,369,392 A | * | 2/1968 | Christensson | 73/49.2 |
| 4,773,502 A | * | 9/1988 | Adair | 181/149 |
| 4,979,390 A | * | 12/1990 | Schupack et al. | 73/38 |
| 5,150,605 A | * | 9/1992 | Simpson | 73/49.3 |
| 7,570,769 B2 | | 8/2009 | Garcia et al. | |
| 2005/0238178 A1 | * | 10/2005 | Garcia et al. | 381/59 |
| 2007/0266773 A1 | * | 11/2007 | Mayer et al. | 73/49.3 |

* cited by examiner

*Primary Examiner* — Hezron E Williams
*Assistant Examiner* — Mark A Shabman
(74) *Attorney, Agent, or Firm* — Kenneth L. Green; Averill & Green

(57) ABSTRACT

A speaker leak test system which quickly tests if a speaker enclosure is sealed properly. The speaker leak test system tests for air leaks in the speaker enclosure, which air leaks degrade the acoustic performance of the speaker. A vacuum (or pressure) source is connected through a vacuum hose to the speaker enclosure and vacuum is drawn. After a test vacuum level is reached, the mass air flow through the vacuum hose is measured. If the mass air flow does not exceed a pre-determined speaker dependent threshold for the speaker under test, the speaker is declared to be leak free. A bypass solenoid may reside in parallel with a mass air flow sensor to reach test vacuum quickly. This speaker leak test system is intended to be used in a prototyping and production environment and tests the speaker enclosure for leaks both quickly (e.g., less than five seconds) and accurately.

17 Claims, 2 Drawing Sheets

SPEAKER LEAK TEST SYSTEM AND METHOD

BACKGROUND OF THE INVENTION

The present invention relates to testing audio speakers and in particular to testing proper sealing of speaker enclosures.

Sound waves are generated both by the face of a speaker and by the rear surface. Generally (but not always), only the sound waves from the face of the speaker are intended to produce the sound heard by a listener. Sound waves produced by the rear of the speaker are out of phase with the sound waves produced by the face of the speaker, and these two sources of sound waves may cancel each other. As a result, if the sound waves from the rear of the speaker escape into the room, they may interfere with the sound produced by the face of the speaker. A known solution is to construct airtight speaker enclosures to reduce this interference and enhance speaker performance.

Known methods for air leak testing include:

underwater air bubble leak testing (too slow and too cumbersome of a test);

listening to possible leak locations using a tube or stethoscope attached to a trained listener's ear while playing low frequency sine waves (too slow, requires training, subjective and not accurate);

measuring how long the enclosure can hold a given pressure (hard to measure accurately with inherently leaky enclosures);

acoustically measure the turbulent air noise generated by air leaks and algorithmically determine if the recorded noise from the speaker exhibits air leaks (uncertain accuracy); and measure the directional acoustic particle velocity of known leak-prone areas of the speaker enclosure and compare these values to a threshold (untested method without established thresholds).

Thus, these known methods are labor intensive, slow, and require a well-trained technician to correctly identify air leaks.

BRIEF SUMMARY OF THE INVENTION

The present invention addresses the above and other needs by providing a speaker leak test system which quickly tests if a speaker enclosure is sealed properly. The speaker leak test system tests for air leaks in the speaker enclosure, which air leaks degrade the acoustic performance of the speaker. A vacuum (or pressure) source is connected through a vacuum hose to the speaker enclosure and vacuum is drawn. After a test vacuum level is reached, the mass air flow through the vacuum hose is measured. If the mass air flow does not exceed a pre-determined speaker dependent threshold for the speaker under test, the speaker is declared to be leak free. A bypass solenoid may reside in parallel with a mass air flow sensor to reach test vacuum quickly. This speaker leak test system is intended to be used in a prototyping and production environment and tests the speaker enclosure for leaks both quickly (e.g., less than five seconds) and accurately.

In accordance with one aspect of the invention, there is provided a system for leak testing of a speaker enclosure. The leak testing system includes a speaker enclosure under test, a vacuum plate; a vacuum source connected to the vacuum plate by a vacuum hose, a vacuum regulator, and a mass air flow sensor for measuring a steady state mass air flow rate through the vacuum hose.

In accordance with another aspect of the invention, there is provided a system for leak testing of a speaker enclosure. The leak test system includes a bypass solenoid in parallel with the mass air flow sensor reducing the time required to reach a test vacuum level.

In accordance with still another aspect of the invention, there is provided a method for leak testing of a speaker enclosure. The leak testing method includes positioning a speaker opening of a speaker enclosure against a mating plate, applying a regulated vacuum to the enclosure under test, controlling the air flow to obtain a test pressure level in the speaker enclosure, waiting for the pressure level to reach the test pressure level, measuring the mass air flow between the speaker enclosure and the air flow source while maintaining the test pressure level, comparing the mass air flow to a threshold, and if the mass air flow does not exceed a threshold, declaring the speaker enclosure to be leak free. Additionally, steps of opening a bypass solenoid before applying a regulated vacuum, and closing the bypass solenoid after the pressure approaches the test vacuum level and before measuring the mass air flow from the speaker enclosure while maintaining the test vacuum level, may be included.

In accordance with yet another aspect of the invention, there is provided a system and method for leak testing of a speaker enclosure using a mass air flow measurement. The mass flow is measured instead of the volumetric flow because the mass flow is more accurate. The calculation of the mass flow takes into consideration the temperature and atmospheric variations that occur over time and yields a result referenced to STP (Standard Temperature and Pressure). The volumetric flow, on the other hand, changes as the temperature in the room varies.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
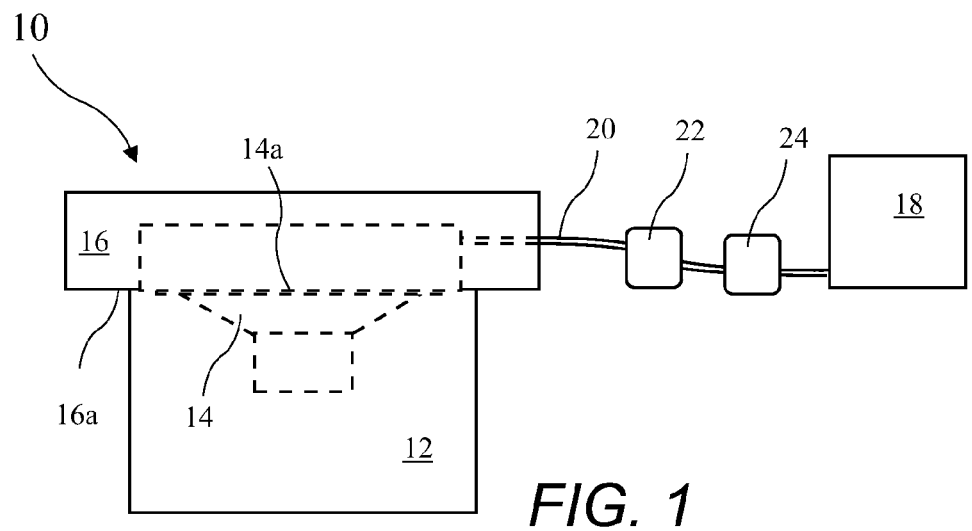
FIG. 1 shows a speaker enclosure leak test system according to the present invention.

A speaker enclosure 12 leak test system 10 is shown in FIG. 1. The leak test system 10 includes a mating plate (e.g., a vacuum plate) 16, an air flow source (e.g., a vacuum source) 18, an air hose (e.g. a vacuum hose) 20, a mass air flow sensor 22 and an air flow regulator (e.g., a vacuum regulator) 24. The speaker enclosure 12 is in contact with a vacuum surface 16a of the vacuum plate 16, with a speaker opening 14a of the enclosure 12 against the vacuum surface 16a. Vacuum is applied by the vacuum source 18 through the hose 20, and the mass air flow is measured by the mass air flow sensor 22. The vacuum regulator 24 controls the air flow drawn from the speaker enclosure 12. When the desired vacuum level is reached in the speaker enclosure 12, the vacuum regulator stops the air flow to the speaker enclosure 12. The vacuum surface 16a is preferably a foam rubber, for example, a highly compliant gap filling closed cell foam, or similar material, and the vacuum created by the leak test system 10 the speaker enclosure 12 to compress against the vacuum plate 16 and makes a good seal. The speaker 14 is preferably not present in the speaker enclosure during leak testing. Test are generally conducted with the plate 16 resting on the speaker enclosure 12, but the speaker enclosure 12 may rest on the vacuum plate 16.

Figure 2:
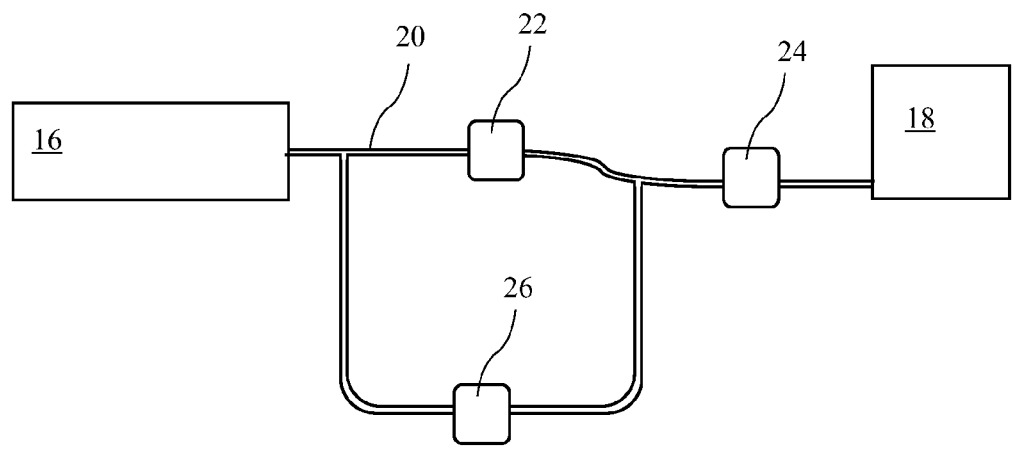
FIG. 2 shows an example of a speaker enclosure leak test system including a bypass solenoid according to the present invention.

An example of a second embodiment of a speaker enclosure leak test system 10a including a bypass solenoid 26 in parallel with the mass air flow sensor 22, according to the present invention, is shown in FIG. 2. The mass air flow sensor 22 presents a restriction to drawing air from the speaker enclosure 12 at the beginning of a leak test. The bypass solenoid 26 opens at the beginning of the leak test, and closes as the vacuum measured by the mass air flow sensor 22 approaches the target test vacuum. As a result, the target test vacuum is reached more quickly.

Figure 3:
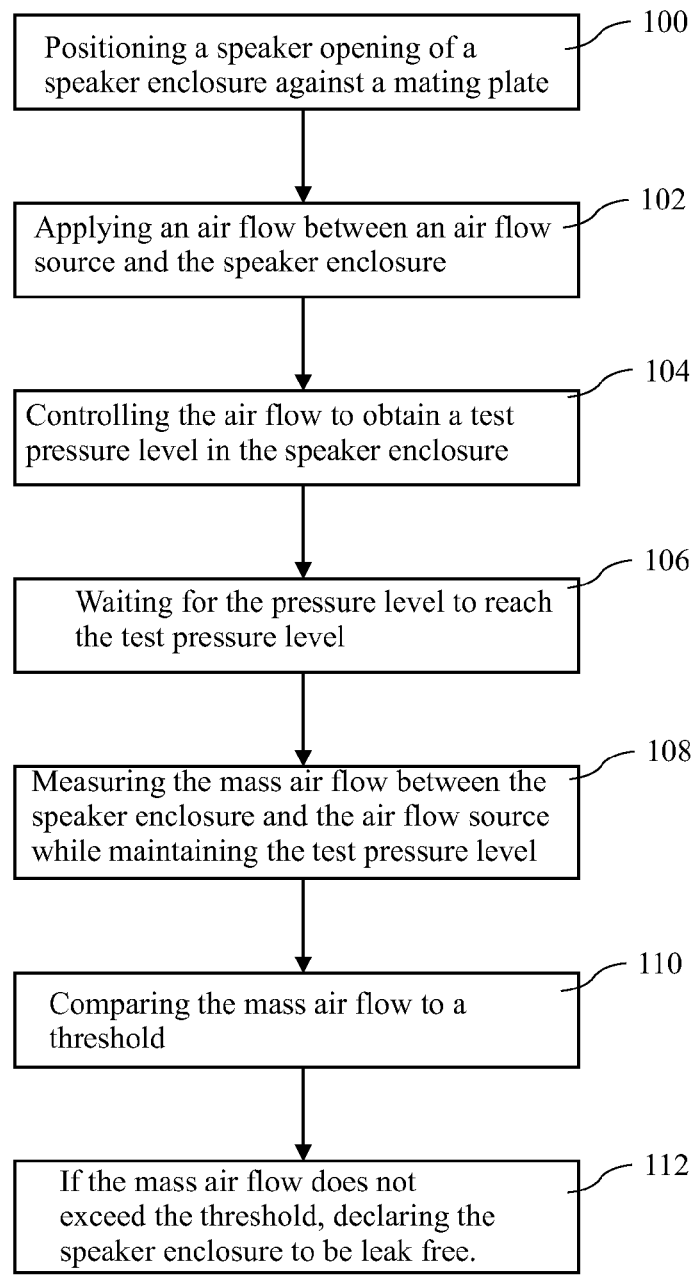
FIG. 3 is a method for performing speaker enclosure leak tests according to the present invention.

A method for leak testing of a speaker enclosure according to the present invention is described in FIG. 3. The method using positive or negative (i.e., vacuum) pressure, and a method using positive or negative pressure is intended to come within the scope of the present invention. The leak testing method includes the following steps: positioning a speaker opening of a speaker enclosure against a mating plate at step 100; applying regulated air to the enclosure under test at step 102; controlling the air flow to obtain a test pressure level in the speaker enclosure at step 104; waiting for the pressure level to reach the test pressure level at step 106; measuring the mass air flow between the speaker enclosure and the air flow source while maintaining the test pressure level at step 108; comparing the mass air flow to a threshold at step 110; and if the mass air flow does not exceed a threshold, declaring the speaker enclosure to be leak free at step 112.

The method of FIG. 3 may be modified to use the speaker enclosure leak test system 10a. In this instance, additional steps of opening a bypass solenoid before applying a regulated vacuum, and closing the bypass solenoid after the measured pressure approaches the test vacuum level and before measuring the mass air flow from the speaker enclosure while maintaining the test vacuum level, are included.

The speaker enclosure 12 is placed under vacuum instead of under pressure because the vacuum plate 16 used to attach the speaker enclosure under test to the testing system is self adhesive (i.e., the vacuum applied to the speaker enclosure 12 helps adhere the vacuum plate 16 to the speaker enclosure 12 and speeds up the test time). The mass flow is measured instead of the volumetric flow because the mass flow is more accurate. The calculation of the mass flow takes into consideration the temperature and atmospheric variations that occur over time and yields a result referenced to STP (Standard Temperature and Pressure). The volumetric flow, on the other hand, changes as the temperature in the room varies.

The vacuum applied to the device under test is regulated so that the mass flow is zero for a leak-free speaker and greater than zero for a leaking speaker. The leak test system 10 could not be used with an unregulated vacuum because the vacuum pump would continuously draw air from the speaker under test. Additionally, the pressure in the speaker enclosure 12 is regulated so that the speaker enclosure 12 is not over stressed by having too much negative pressure (i.e., too much vacuum) in the speaker enclosure 12. Preferably, the speaker enclosure 12 under test must not leak when the gauge pressure inside that speaker enclosure 12 is twice the pressure that the speaker enclosure 12 experiences under extreme operating conditions. For example, it was approximated that under extreme operating conditions the speaker enclosure 12 of the speaker in the Audyssey Audio Dock (manufactured by the inventor's assignee) could at most experience a pressure of +/−0.75 Pounds per Square Inch Gauge (PSIG) inside the speaker enclosure 12. Based on the applying twice the extreme operating conditions pressure, the Audyssey Audio Dock is tested at a vacuum level of −1.5 PSIG.

Once the speaker enclosure 12 has reached the test vacuum level, the mass flow of the air being drawn out of the speaker enclosure 12 by the vacuum source 18 is measured. If there is a leak in the speaker enclosure 12 under test, the mass flow of the air required to maintain the speaker enclosure 12 at the specified test vacuum level will be greater than zero Standard Fluid Liters Per Minute (SFLPM). The mass flow measured by the mass air flow sensor 22 is a measurement of mass flow of the air leaking into the speaker enclosure 12. The leak test of the present invention provides a numeric value associated with how much air is leaking into a speaker enclosure 12 over time.

A threshold is required to establish an amount of air which may be measured to be leaking into the speaker enclosure 12 to consider it to be air tight (i.e., leak free). For example, through experimentation with a known speaker enclosure 12, it was found that air leaks below 0.05 SFLPM had negligible audible affects using the tube-to-ear method while playing low frequency tones. A leak rate of 0.05 SFLPM is a very slow leak, and setting the threshold for leaks any smaller would begin to enter the noise floor of the measurement. For example, once the leak test system 10 reaches steady state during a speaker enclosure 12 test, in the speaker enclosure 12 under test, the leak rate threshold may be selected based on the observed measurement noise limited by the acceptable leak rate, for example, observing a measurement of a mass air flow sensor and acoustically verifying that speaker enclosures below the threshold do not produce audible distortions caused by air leaks. A preferred mass air flow sensor is a laminar flow sensor. Other acceptable sensors include a hot wire mass airflow sensor, a hot film mass air flow sensor, a cold wire sensor, Karman vortex sensor, and a membrane mass air flow sensor.

The vacuum pump 18, mass air flow sensor 22 and a vacuum regulator 24, and (when included) bypass solenoid 26 are preferably sized for the internal volume of the speaker enclosure 12 and the desired speed of the leak test. Further, while the leak test is herein described using vacuum to provide the convenience of drawing the speaker enclosure 12 against the vacuum surface 16a of the vacuum plate 16, the speaker enclosure 12 could be held against the vacuum surface 16a of the vacuum plate 16 and pressure could be used to replace vacuum. Using vacuum or pressure may be preferred for specific speaker enclosures depending on the structure and construction of the speaker enclosure being tested.

While the invention herein disclosed has been described by means of specific embodiments and applications thereof, numerous modifications and variations could be made thereto by those skilled in the art without departing from the scope of the invention set forth in the claims.

I claim:

1. A method for measuring speaker enclosure leakage, the method comprising:
    positioning a speaker opening of a speaker enclosure against a mating plate;

assembling a mass flow sensor and air flow regulator serially in fluid communication between the mating plate and an air flow source;

applying a regulated air flow by the air flow source through the mass flow sensor and the air flow regulator to the speaker enclosure under test;

regulating the air flow to obtain a test pressure level in the speaker enclosure;

measuring the pressure level in the speaker enclosure to obtain a measured pressure level;

waiting for the measured pressure level to reach the test pressure level;

measuring the mass air flow between the speaker enclosure and the air flow source by the mass flow sensor while maintaining the test pressure level;

comparing the mass air flow to a threshold; and if the mass air flow does not exceed a threshold, declaring the speaker enclosure to be leak free.

2. The method of claim 1, wherein waiting for the pressure level to reach a test pressure level comprises waiting for the pressure level to reach the test pressure level of twice an extreme pressure level experienced under extreme operating conditions.

3. The method of claim 2, wherein the test pressure level is a negative gauge pressure level.

4. The method of claim 2, wherein the test pressure level is a positive gauge pressure level.

5. The method of claim 2, wherein the test pressure level is twice a pressure level experienced under extreme operating conditions.

6. The method of claim 1, wherein waiting for the pressure level to reach a test pressure level comprises waiting for the pressure level to reach a test vacuum level of about −1.5 PSIG.

7. The method of claim 1, wherein comparing the mass air flow to a threshold comprises comparing the mass air flow to a threshold of at least 0.05 Standard Fluid Liters Per Minute (SFLPM).

8. The method of claim 1, wherein comparing the mass air flow to a threshold comprises comparing the mass air flow to a threshold selected based on observed measurement of a mass air flow sensor and acoustically verifying that speaker enclosures below the threshold do not produce audible distortions caused by air leaks.

9. The method of claim 1, wherein positioning a speaker opening of a speaker enclosure under test against a vacuum plate comprises positioning a vacuum surface of the vacuum plate facing down against the speaker opening facing up.

10. The method of claim 9 wherein the vacuum surface comprises a foam rubber material.

11. The method of claim 9 wherein the vacuum surface comprising a highly compliant gap filling closed cell material.

12. The method of claim 1, further including:
opening a bypass solenoid residing in parallel with a mass flow sensor measuring the mass air flow between the speaker enclosure and the air flow source, before applying a regulated vacuum; and
closing the bypass solenoid after the measured pressure level approaches a test vacuum level, and before measuring the mass air flow from the speaker enclosure while maintaining the test vacuum level.

13. The method of claim 1, wherein positioning a speaker opening of a speaker enclosure against a mating plate comprises positioning the speaker opening of the speaker enclosure, absent a speaker, against a mating plate.

14. The method of claim 1, further including:
opening a bypass solenoid residing in parallel with a mass flow sensor measuring the mass air flow between the speaker enclosure and the air flow source, before applying the regulated air flow; and
closing the bypass solenoid after the measured pressure level approaches a test pressure level, and before measuring the mass air flow from the speaker enclosure while maintaining the test vacuum level.

15. The method of claim 1, wherein regulating the air flow to obtain a test pressure level in the speaker enclosure comprises adjusting the air flow regulator to control the regulated air flow to obtain a test pressure level in the speaker enclosure.

16. A method for measuring speaker enclosure leakage, the method comprising:
positioning a speaker opening of a speaker enclosure against a mating plate;
assembling a mass flow sensor and air flow regulator serially in fluid communication between the mating plate and an air flow source;
applying a regulated air flow by an air flow source to the speaker enclosure under test;
regulating the air flow to obtain a negative gauge test pressure level in the speaker enclosure;
measuring the pressure level in the speaker enclosure to obtain a measured pressure level;
waiting for the measured pressure level to reach the test pressure level of twice an extreme pressure level experienced under extreme operating conditions;
measuring the mass air flow between the speaker enclosure and the air flow source while maintaining the test pressure level;
comparing the mass air flow to a threshold; and
if the mass air flow does not exceed a threshold, declaring the speaker enclosure to be leak free.

17. A method for measuring speaker enclosure leakage, the method comprising:
determining a mass air flow threshold by observing a mass air flow sensor in fluid communication with the speaker enclosure and verifying that a mass air flow below the mass air flow threshold does not produce audible distortions;
positioning a speaker opening of a speaker enclosure against a mating plate;
assembling a mass flow sensor and air flow regulator serially in fluid communication between the mating plate and an air flow source;
applying a regulated air flow by the air flow source through the mass flow sensor and the air flow regulator to the speaker enclosure under test;
regulating the air flow to obtain a test pressure level in the speaker enclosure;
measuring the pressure level in the speaker enclosure to obtain a measured pressure level;
waiting for the measured pressure level to reach the test pressure level;
measuring the mass air flow between the speaker enclosure and the air flow source while maintaining the test pressure level;
comparing the mass air flow to the mass air flow threshold; and
if the mass air flow does not exceed the mass air flow threshold, declaring the speaker enclosure to be leak free.

* * * * *